United States Patent

Nagasaka

[11] Patent Number: 5,931,180
[45] Date of Patent: Aug. 3, 1999

[54] ELECTROPNEUMATIC POSITIONER

[75] Inventor: Fumio Nagasaka, Tokyo, Japan

[73] Assignee: Yamatake Corporation, Tokyo, Japan

[21] Appl. No.: 09/162,410

[22] Filed: Sep. 29, 1998

[30] Foreign Application Priority Data

Dec. 8, 1997 [JP] Japan .................................. 9-337503

[51] Int. Cl.[6] .................................................. G05B 11/48
[52] U.S. Cl. ........................... 137/85; 91/361; 91/363 R; 137/487.5
[58] Field of Search .............................. 91/361, 363 R; 137/85, 487.5

[56] References Cited

U.S. PATENT DOCUMENTS

| | | | |
|---|---|---|---|
| 4,623,871 | 11/1986 | Akano ................................ | 340/310 A |
| 4,633,217 | 12/1986 | Akano ................................ | 340/310 A |
| 4,719,616 | 1/1988 | Akano ................................ | 370/11 |
| 5,431,182 | 7/1995 | Brown ................................ | 137/85 |
| 5,590,677 | 1/1997 | Kuroda ................................ | 137/85 |

Primary Examiner—Gerald A. Michalsky
Attorney, Agent, or Firm—Blakely Sokoloff Taylor & Zafman

[57] ABSTRACT

An electropneumatic positioner includes a data processing control section and an electropneumatic converter. The control section includes first and second position determining sections and a signal setting section. The first position determining section obtains the valve opening degree positions of a regulating valve as the minimum and maximum valve opening degree positions which are set when a driving signal for conversion from an electrical signal into an air pressure is set to the minimum signal and the maximum signal. The second position determining section obtains the valve opening degree position of the valve which is set when the driving signal is the minimum signal on the basis of the relative positional relationship between the obtained minimum and maximum valve opening degree positions and the valve plug form of the valve. The signal setting section sets a relationship between the maximum and minimum signals of electrical signals and full opening and closing directions corresponding to valve opening degrees of the valve.

12 Claims, 11 Drawing Sheets

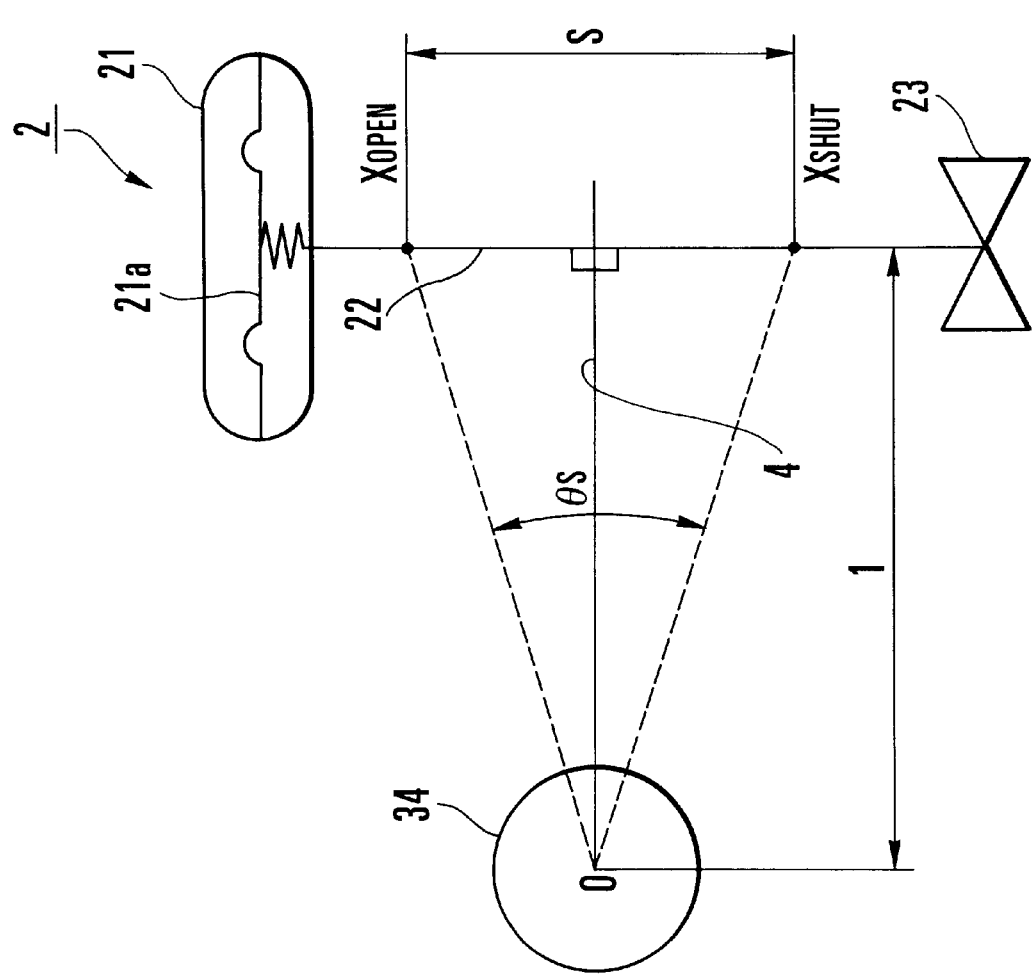
F I G. 2

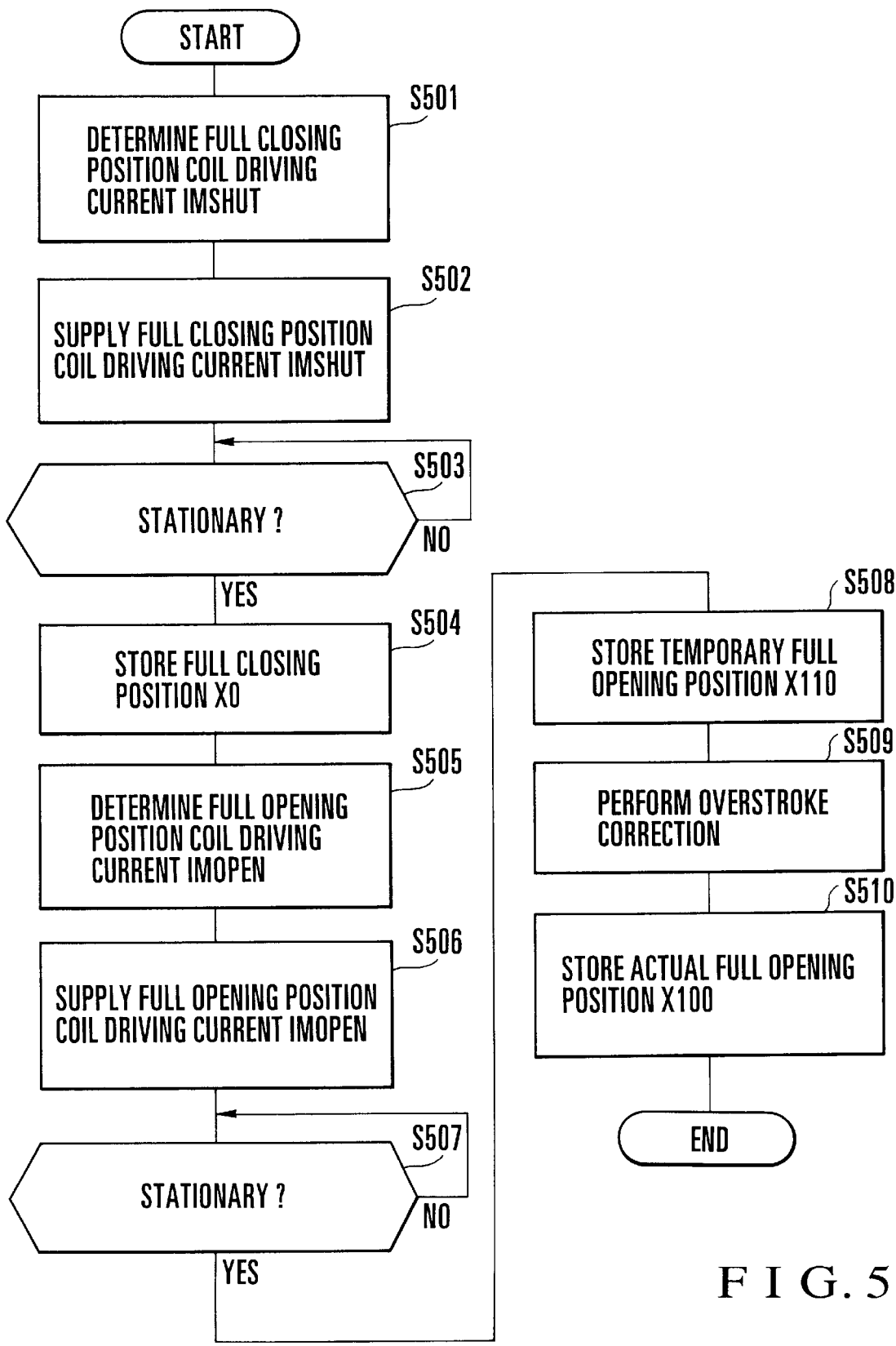
F I G. 5

| SIZE OF OPERATING UNIT | RESPONSE TIME TRES |
|---|---|
| 1 | 1~2 |
| 2 | 2~4 |
| 3 | 4~8 |

| HYSTERESIS LEVEL HYS | ERROR AVERAGE EA |
|---|---|
| H (HEAVY) | m ~ n % |
| M (MEDIUM) | l ~ m % |
| L (LIGHT) | k ~ l % |

FIG. 10

| HYS | KP | T1 | TD | GE | GKP | GT1 | GTD | SIZE OF OPERATING UNIT |
|---|---|---|---|---|---|---|---|---|
| H | a1 | b1 | c1 | ±d% | e1 | f1 | g1 | 1 |
| M | a2 | b2 | c2 | ±d% | e2 | f2 | g2 | |
| L | a3 | b3 | c3 | ±d% | e3 | f3 | g3 | |
| H | a4 | b4 | c4 | ±d% | e4 | f4 | g4 | 2 |
| M | a5 | b5 | c5 | ±d% | e5 | f5 | g5 | |
| L | a6 | b6 | c6 | ±d% | e6 | f6 | g6 | |
| H | a7 | b7 | c7 | ±d% | e7 | f7 | g7 | 3 |
| M | a8 | b8 | c8 | ±d% | e8 | f8 | g8 | |
| L | a9 | b9 | c9 | ±d% | e9 | f9 | g9 | |

FIG. 11

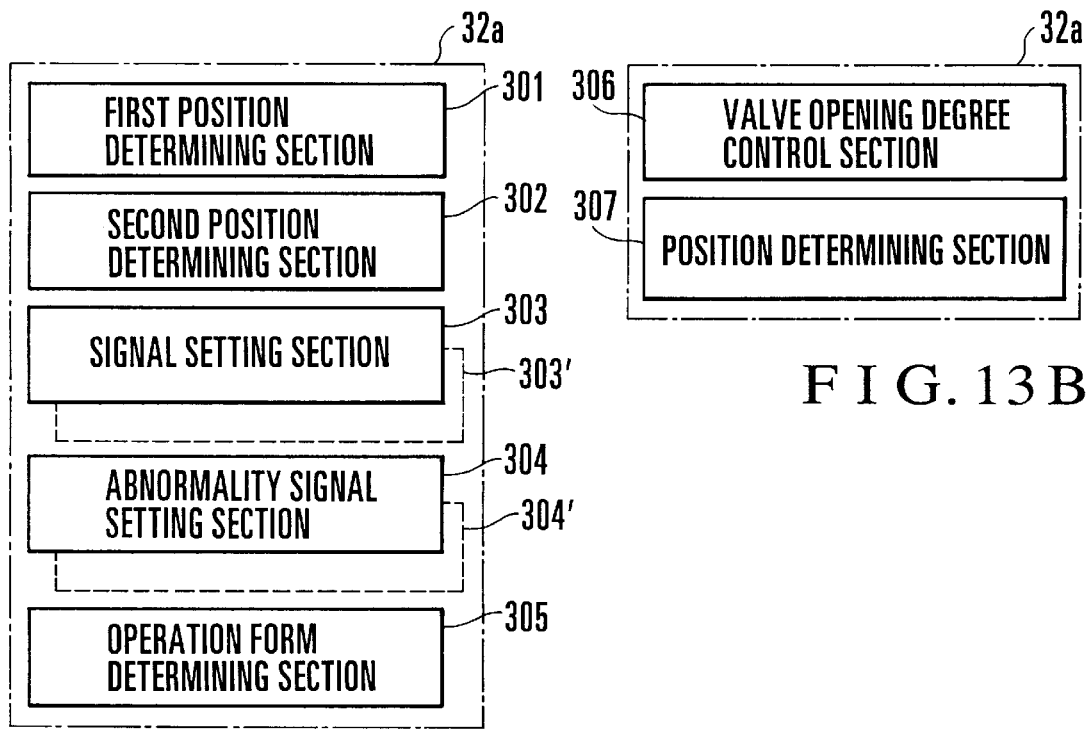
F I G. 13 A
F I G. 13 B
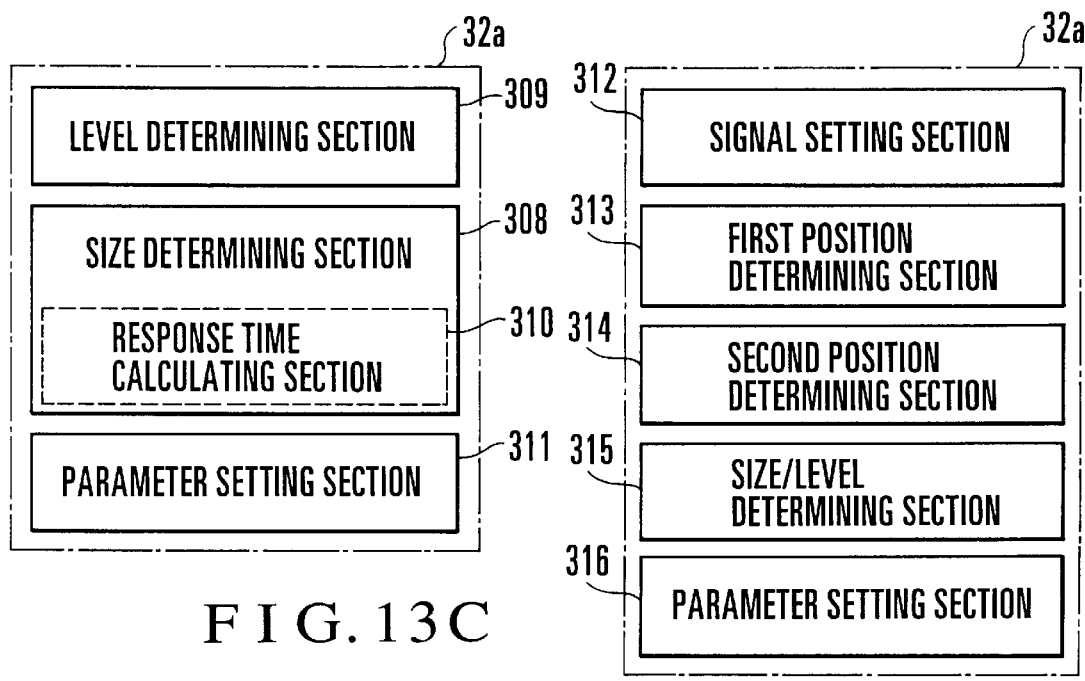
F I G. 13 C
F I G. 13 D

ELECTROPNEUMATIC POSITIONER

BACKGROUND OF THE INVENTION

The present invention relates to an electropneumatic positioner for converting an input electrical signal into an air pressure by using an electropneumatic converter, and supplying the air pressure to an operating unit, thereby controlling the valve opening degree of a regulating valve for opening/closing a channel.

When an electropneumatic positioner including both a positioner function and an electropneumatic conversion function and serving as a kind of air pressure servo mechanism is to be newly installed or replace an old one, various settings, zero/span adjustment, and tuning of control parameters must be performed on the site of installation. Note that zero/span adjustment and tuning of control parameters are also performed in regular maintenance.

According to a conventional electropneumatic positioner, however, an operator performs the above various settings, zero/span adjustment, and tuning of control parameters. This imposes a heavy load on the operator, resulting in many mistakes. This tendency becomes noticeable when various types of adjusting valves are combined with each other.

SUMMARY OF THE INVENTION

It is an object of the present invention to provide an electropneumatic positioner which can reduce the load on an operator and eliminate operation mistakes during installation and maintenance of the positioner.

In order to achieve the above object, according to the present invention, there is provided an electropneumatic positioner comprising control means for outputting an electrical signal on the basis of an automatic setting command, and electropneumatic conversion means for converting the electrical signal from the control means into an air pressure, the electropneumatic positioner being adapted to control a valve opening degree of a regulating valve for opening/closing a channel by supplying the air pressure from the electropneumatic conversion means to an operating unit of the regulating valve, the control means including first position determining means for obtaining valve opening degree positions of the regulating valve as minimum and maximum valve opening degree positions which are set when a driving signal for conversion from an electrical signal into an air pressure is set to a minimum signal and a maximum signal, second position determining means for obtaining the valve opening degree position of the regulating valve which is set when the driving signal is the minimum signal on the basis of a relative positional relationship between the obtained minimum and maximum valve opening degree positions and a valve plug form of the regulating valve, and first setting means for setting a relationship between the maximum and minimum signals of electrical signals and full opening and closing directions corresponding to valve opening degrees of the regulating valve.

BRIEF DESCRIPTION OF THE DRAWINGS

FIG. 2 is a view showing the relationship between the angle sensor and the regulating valve in FIG. 1;

FIG. 5 is a flow chart showing zero/span adjustment control executed by the data processing section of the electropneumatic positioner in FIG. 1;

FIG. 10 is a view showing an HYS (hysteresis level)/EA (error average) table;

FIG. 11 is a view showing a PID control parameter table;

FIGS. 13A, 13B, 13C, and 13D are block diagrams respectively showing the functional blocks of the CPU in FIG. 1 which are respectively used to execute the control operations shown in FIGS. 3, 5, 6, and 12.

DESCRIPTION OF THE PREFERRED EMBODIMENTS

The present invention will be described in detail below with reference to the accompanying drawings.

Figure 1:
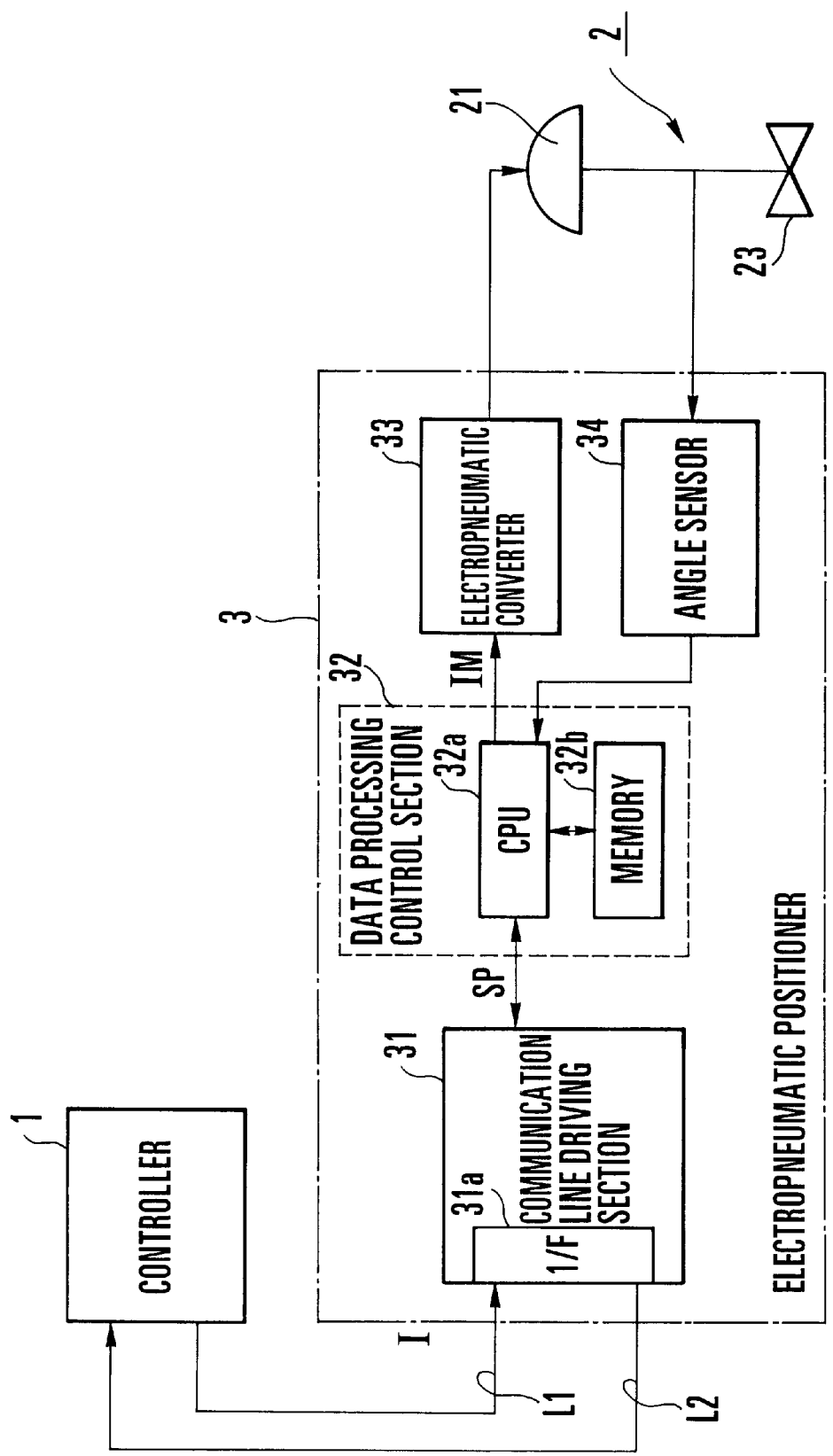
FIG. 1 is a block diagram showing the arrangement of a regulating valve control system according to the first embodiment of the present invention.

FIG. 1 shows the arrangement of a regulating valve control system according to the first embodiment of the present invention. Referring to FIG. 1, reference numeral 1 denotes a controller; 2, a regulating valve; and 3, an electropneumatic positioner for controlling the valve opening degree of the regulating valve 2 in accordance with a command from the controller 1. Reference symbols L1 and L2 denote communication lines for connecting the controller 1 and the electropneumatic positioner 3 to each other. An input current I of 4 to 20 mA is supplied as a set value from the controller 1 to the electropneumatic positioner 3 through the communication lines L1 and L2.

The electropneumatic positioner 3 includes a communication line driving section 31 connected to the communication lines L1 and L2, a data processing control section 32 for inputting/outputting data from/to the communication line driving section 31, an electropneumatic converter 33 for converting the electrical signal output from the data processing control section 32 into an air pressure, and an angle sensor 34 for measuring the angle of the regulating valve 2. The communication line driving section 31 has an interface 31a for communicating data with the controller 1.

The data processing control section 32 includes a CPU (Central Processing Unit) 32a and a memory 32b, and processes the set value data input from the controller 1 through the communication line driving section 31. More specifically, the data processing control section 32 sets a coil driving current IM to 0 mA which is to be supplied to the electropneumatic converter 33 in response to input current I=4 mA from the controller 1, and also sets the coil driving current IM to the maximum value which is to be supplied to the electropneumatic converter 33 in response to input current I=20 mA. The electropneumatic converter 33 converts the electrical signal from the data processing control section 32 into an electropneumatic conversion signal (air pressure) and supplies it to the regulating valve 2.

The regulating valve 2 includes an operating unit 21 that receives the electropneumatic conversion signal from the electropneumatic positioner 3, and a valve 23 whose opening degree is controlled by an output from the operating unit 21.

The angle sensor 34 is a sensor for detecting the opening degree of the valve 23 as the rotational angular position (lever angular position) of a feedback lever to be described later. The angle sensor 34 supplies the detected lever angular position to the data processing control section 32. The data processing control section 32 performs feedback-controls the opening degree of the valve 23 on the basis of the lever angular position from the angle sensor 34. In addition, the data processing control section 32 transmits an electrical signal output corresponding to the opening degree of the valve 23 to the controller 1 through the communication line driving section 31 and the communication lines L1 and L2 on the basis of the lever angular position from the angle sensor 34.

The control operation of the data processing control section 32 will be described next with reference to FIG. 2.

FIG. 2 shows the relationship between the electropneumatic positioner 3, the angle sensor 34, and the regulating valve 2. In addition to the operating unit 21 and the valve 23, the regulating valve 2 includes a valve stem 22 for mechanically coupling the operating unit 21 and the valve 23 to each other. The operating unit 21 has a diaphragm 21a that is displaced in accordance with the air pressure input from the electropneumatic converter 33. The operating unit 21 adjusts the opening degree of the valve 23 by vertically moving the valve stem 22 in accordance with the displacement of the diaphragm 21a.

A feedback lever 4 is coupled between the angle sensor 34 and the valve stem 22 to detect the lift position of the valve stem 22, i.e., the opening degree of the valve 23. The feedback lever 4 pivots about a center O of the angle sensor 34 in accordance with the lift position of the valve stem 22. The opening degree of the valve 23 can therefore be detected from the rotational angular position (lever angular position) of the feedback lever 4.

[Automatic Setting]

Figure 3:
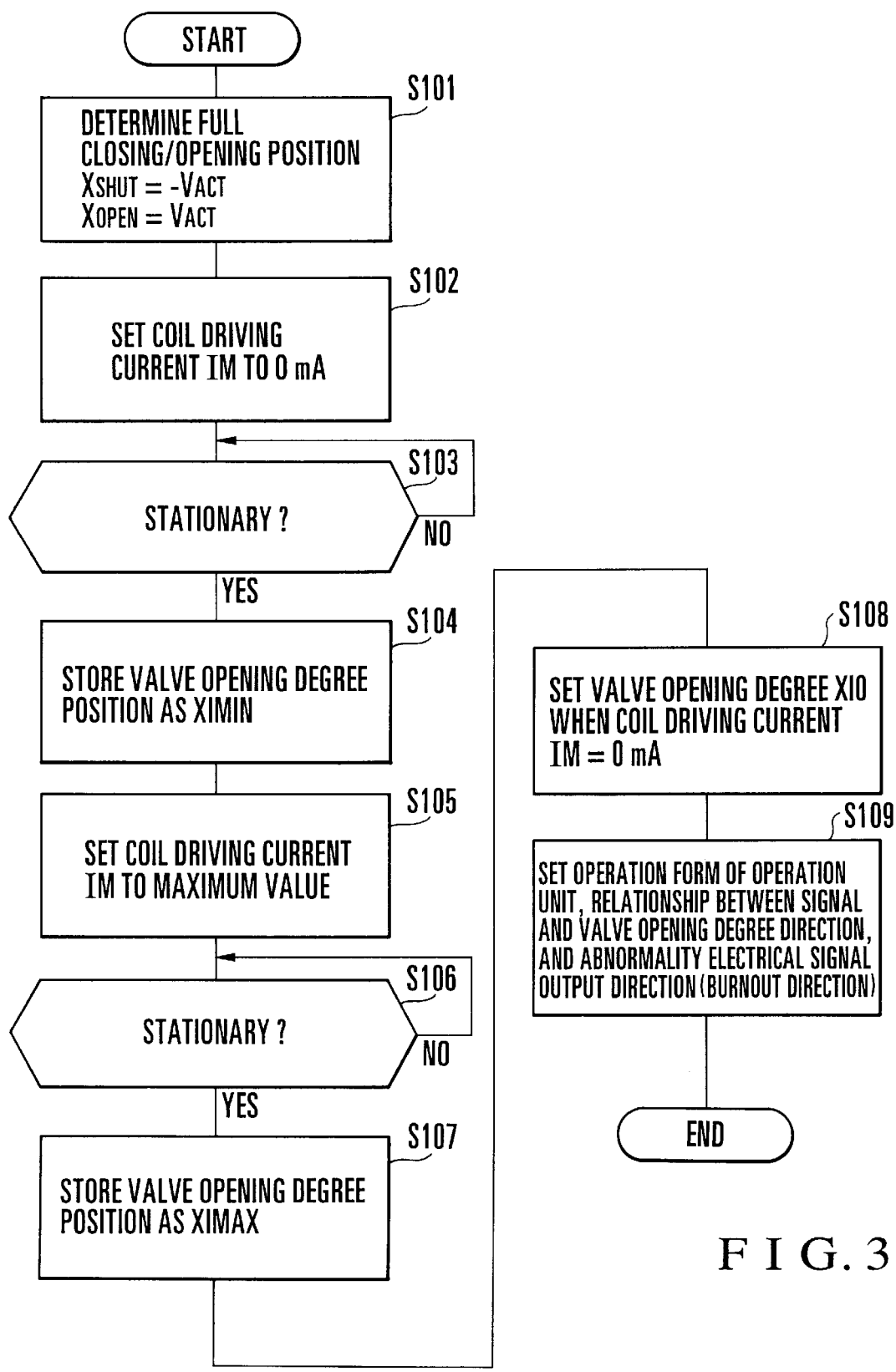
FIG. 3 is a flow chart showing automatic setting control executed by the data processing section of the electropneumatic positioner in FIG. 1.

The data processing control section 32 automatically sets "full closing/opening position", "operation form of operating unit", "relationship between signal and valve opening degree direction", or "abnormality electrical signal output direction (burnout direction)" in accordance with the flow chart shown in FIG. 3 upon reception of an automatic setting command. In this case, the automatic setting command is supplied to the data processing control section 32 when the operator operates a switch (not shown) arranged on the electropneumatic positioner 3. Note that this command may be supplied from a setting unit (not shown) or the controller 1 through the interface 31a.

Figure 4A:
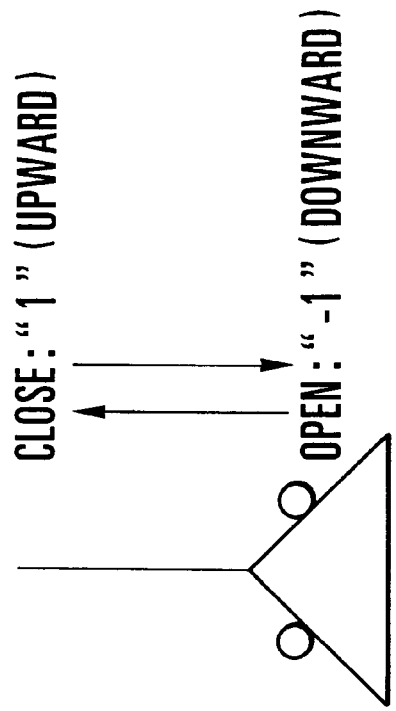
FIGS. 4A and 4B are views for explaining a push-down close and a push-down open as valve plug forms for the regulating valve in FIG. 1.
Figure 4B:
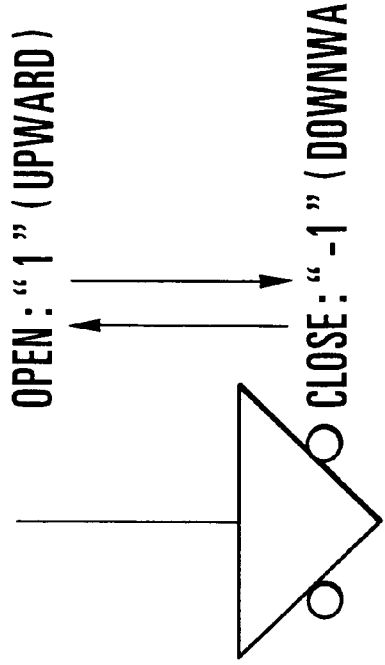

In the flow chart shown in FIG. 3, "full closing/opening position" is determined in accordance with the valve plug of the regulating valve 2 (step S101). Assume that the valve plug located above the valve seat as shown in FIG. 4A will be referred to as a push-down close, and the valve plug located below the valve seat as shown in FIG. 4B will be referred to as a push-down open. More specifically, the push-down close is represented by VACT=1; and the push-down open, by VACT=−1. More specifically, the full closing and opening position of the push-down close are respectively represented by XSHUT=−VACT=−1 (closed=downward) and XOPEN=VACT=1 (open=upward), whereas the full closing and opening positions of the push-down open are respectively represented by XSHUT=−VACT=1 (closed=upward) and XOPEN=VACT=−1 (open=downward). Note that the valve plug form of the regulating valve 2 is input as data in advance.

Subsequently, the coil driving current IM is set to 0 mA in accordance with input current I=4 mA from the controller 1 (step S102). That is, the coil driving current IM to the electropneumatic converter 33 is set to the minimum value. With this operation, the air pressure corresponding to IM=0 mA is supplied to the operating unit 21 of the regulating valve 2 through the electropneumatic converter 33. As a result, the opening degree of the valve 23 is adjusted to the opening degree position corresponding to IM=0 mA. It is then checked whether the valve 23 is stationary (step S103). If it is determined that the valve 23 is stationary, the opening degree position of the valve 23 is stored as XIMIN (step S104).

The coil driving current IM is then set to the value corresponding to an input current of 20 mA from the controller 1 (step S105). That is, the coil driving current IM to the electropneumatic converter 33 is set to the maximum value. With this operation, the air pressure corresponding to IM=maximum value is supplied from the electropneumatic converter 33 to the operating unit 21 of the regulating valve 2. As a result, the opening degree of the valve 23 is adjusted to the opening degree position corresponding to IM=maximum value. It is then checked whether the valve 23 is stationary (step S106). If it is determined that the valve 23 is stationary, the opening degree position of the valve 23 is stored as XIMAX (step S107).

In this case, the processing in steps S105 to S107 may be performed before the processing in steps S102 to S104. That is, the sequence of the processing in steps S105 to S107 and the processing in steps S102 to S104 may be switched such that the processing in steps S102 to S104 is performed after the processing in steps S105 to S107.

A valve opening degree XI0 of the regulating valve 2 which is set when the coil driving current IM is 0 mA is obtained from the relative positional relationship between the valve opening degree position XIMIN stored in step S104 and the valve opening degree position XIMAX stored in step S107 and the valve plug form VACT of the regulating valve 2 according to equation (1) below (step S108). XI0=1 represents the fully open state; and XI0=−1, the fully closed state. Note that in equation (1), Sgn(X) is the function that becomes "1" if X≧0; and "−1", if X<0.

$$XI0 = Sgn(XIMIN - XIMAX) \cdot VACT \qquad \ldots (1)$$

In step S109, an operation form AACT (AACT=1: push-down closing operation; AACT=−1: push-down opening operation) of the operating unit 21 is obtained from the valve opening degree position XI0 of the regulating valve 2 which is set when the coil driving current IM is 0 mA, and an operation form PACT of the electropneumatic positioner 3 itself, and the valve plug form VACT of the regulating valve 2 according to equation (2) below.

$$AACT = XI0 \cdot PACT \cdot VACT \qquad (2)$$

Note that PACT=1 represents that the characteristics of the electropneumatic positioner 3 correspond to those of a push-down closing operation type positioner (to be referred to as a push-down closing positioner hereinafter), and PACT=−1 represents that the characteristics of the electropneumatic positioner 3 correspond to those of a push-down opening operation type positioner (to be referred to as a push-down opening positioner hereinafter). With the push-down closing positioner, the output air pressure to be supplied to the regulating valve 2 increases as the coil driving current IM increases. With the push-down opening positioner, the output air pressure to be supplied to the regulating valve 2 decreases as the coil driving current IM increases.

Note that the operation form of the electropneumatic positioner 3 itself is input as data in advance. The push-down closing operation (AACT=1) of the operating unit 21 indicates that the valve stem 22 moves down when air is supplied from the electropneumatic positioner 3. The push-down opening operation (AACT=−1) indicates that the valve stem 22 moves up when air is supplied from the electropneumatic positioner 3.

In step S109, setting operation is performed, on the basis of the valve opening degree position XI0 of the regulating valve 2 which is set when the coil driving current IM is 0 mA, to make the maximum value (20 mA) and minimum value (4 mA) of the input current I correspond to signals each used to control the valve opening degree of the regulating valve 2 in either the full opening direction or the full closing direction. More specifically, in the fully closed state represented by XI0=−1, the full closing current (4 mA)<full opening current (20 mA). In addition, in the fully open state represented by XI0=1, the full closing current (20 mA)>full opening current (4 mA).

In addition, in step S109, the abnormality electrical signal output direction (burnout direction) is determined from the valve opening degree position XI0 of the regulating valve 2 which is set when the coil driving current IM is 0 mA. More specifically, in the fully closed state represented by XI0 −−1, when an abnormality occurs, the valve opening degree of the regulating valve 2 is forcibly set as "fully closed". In addition, in the fully open state represented by XI0=1, when an abnormality occurs, the valve opening degree of the regulating valve 2 is forcibly set as "fully open".

The reason why the abnormality electrical signal output direction is determined on the basis of the valve opening degree position XI0 set when the coil driving current IM is 0 mA is that an abnormal state is a state wherein the electropneumatic positioner 3 cannot control the valve opening degree of the regulating valve 2 upon interruption of the supply of power to the electropneumatic positioner 3, destruction of the memory 32b in the electropneumatic positioner 3, or the like i.e., a state wherein the coil driving current IM cannot be supplied.

In the above embodiment, the two factors, i.e., the relationship between the electrical signal and the valve opening degree direction and the abnormality electrical signal output direction, are determined from the valve opening degree position XI0 of the regulating valve 2 which is set when the coil driving current IM is 0 mA. However, the relationship between the electrical signal and the valve opening degree direction and the abnormality electrical signal output direction may be determined on the basis of the operation form PACT of the electropneumatic positioner 3 itself, the operation form AACT of the operating unit 21, and the valve plug form VACT of the regulating valve 2 (to be described later in association with a signal setting section 303' and an abnormality signal setting section 304').

If, for example, PACT·AACT·VACT=−1, full closing current (4 mA)<full opening current (20 mA) is set. If PACT·AACT·VACT=1, full closing current (20 mA)>full opening current (4 mA) is set. In addition, if PACT·AACT·VACT=−1, an output air pressure is set to make the valve opening degree of the regulating valve 2 correspond to "fully closed". If PACT·AACT·VACT=1, an output air pressure is set to make the valve opening degree of the regulating valve 2 correspond to "fully open".

In this case, the operation form AACt of the operating unit 21 may be input as data in advance. When the operation form AACT of the operating unit 21 is obtained from equation (2) above, even if the operation form AACT of the operating unit 21 is unknown, an input current set value and the abnormality electrical signal output direction can be determined.

[Zero/Span Adjustment]

The data processing control section 32 performs automatic zero/span adjustment in accordance with the flow chart shown in FIG. 5 upon reception of a zero/span adjustment command. In this case, the zero/span adjustment command is supplied to the data processing control section 32 when the operator operates a switch (not shown) arranged on the electropneumatic positioner 3. However, this command may be supplied from a setting unit (not shown) or the controller 1 through the interface 31a.

In the flow chart shown in FIG. 5, first of all, a coil driving current IMSHUT corresponding to the full closing position is determined according to equation (3) below (step S501). In this case, if ISHUT=1, IMSHUT is set to the maximum value. If ISHUT=−1, IMSHUT is set to 0 mA.

$$ISHUT = PACT \cdot AACT \cdot VACT \qquad \ldots (3)$$

Subsequently, IMSHUT determined in step S501 is supplied to the electropneumatic converter 33 (step S502). With this operation, the air pressure corresponding to IMSHUT is supplied from the electropneumatic converter 33 to the operating unit 21 of the regulating valve 2, and the opening degree of the valve 23 is adjusted to the opening degree position (full closing position) corresponding to IMSHUT. It is then checked whether the valve 23 is stationary (step S503). If it is determined that the valve 23 is stationary, the opening degree position X0 of the valve 23 is stored as a zero point position (step S504).

A coil driving current IMOPEN corresponding to the full opening position is determined according to equation (4) (step S505). In this case, if IOPEN=1, IMOPEN is set to the maximum value. If IOPEN=−1, IMOPEN is set to 0 mA. As is also obvious from equation (4), the reverse coil driving current of the full closing position coil driving current IMSHUT is the full opening position coil driving current IMOPEN.

$$IOPEN = ISHUT \cdot (-1) \qquad \ldots (4)$$

IMOPEN determined in step S505 is supplied to the electropneumatic converter 33 (step S506). With this operation, the air pressure corresponding to IMOPEN is supplied from the electropneumatic converter 33 to the operating unit 21 of the regulating valve 2. As a result, the opening degree of the valve 23 is adjusted to the opening degree position corresponding to IMOPEN (the maximum opening degree position, e.g., the 110% position corresponding to an opening degree set to be slightly greater than the opening degree to which the actual full opening position corresponds in consideration of a margin). It is checked whether the valve 23 is stationary (step S507). If it is determined that the valve 23 is stationary, the opening degree position of the valve 23 is stored as a temporary full opening position X110 (step S508).

An actual full opening position X100 is obtained from the full closing position X0 stored in step S504 and the temporary full opening position X110 stored in step S508 according to equation (5) below (step S509). That is, the actual full opening position X100 is obtained by performing overstroke correction for the temporary full opening position X110.

$$X100=[(X110-X0)/1.1]+X0 \qquad \ldots (5)$$

The obtained actual full opening position X100 is stored as a span point position (step S510). In this case, the precision improves as compared with a case wherein X110 is stored as a span point position.

In this zero/span adjustment, the maximum full opening position (overstroke value) is, for example, a fixed value of 110%. However, this value may be changed by using a forcible full opening value or the like (+1% of the forcible full opening value is a overstroke value), or may be obtained by referring to a built-in standard span angle table on the basis of a measured span angle and operating unit information (an approximate angle is selected because an overstroke value is included).

[Automatic Tuning]

Figure 6:
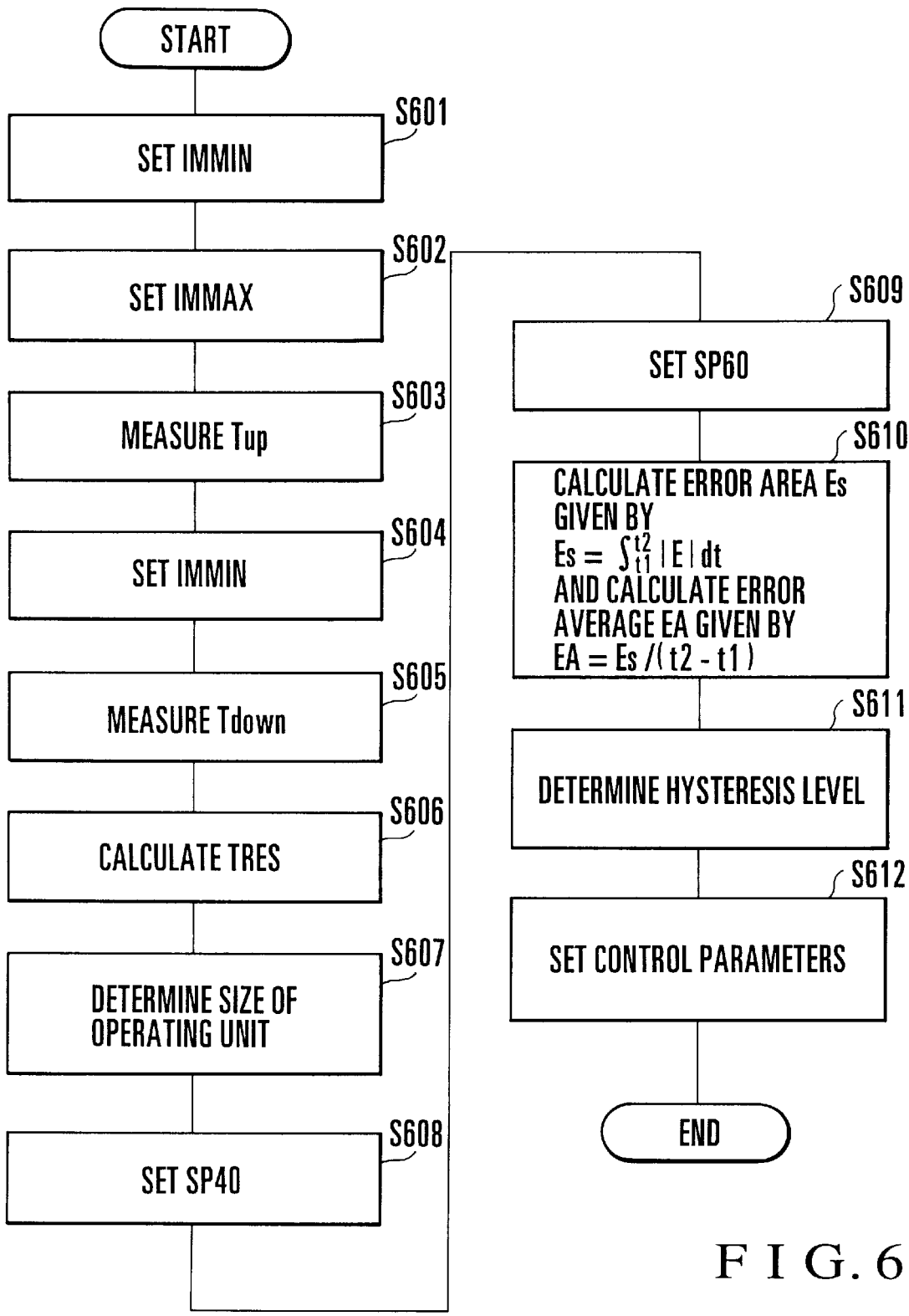
FIG. 6 is a flow chart showing automatic tuning control executed by the data processing section of the electropneumatic positioner in FIG. 1.

The data processing control section 32 automatically tunes PID control parameters in accordance with the flow chart shown in FIG. 6 upon reception of an automatic tuning command. In this case, the automatic tuning command is supplied to the data processing control section 32 when the operator operates a switch (not shown) arranged on the electropneumatic positioner 3. Note that this command may be supplied from a setting unit (not shown) or the controller 1 through the interface 31a.

Figures 7, 8:
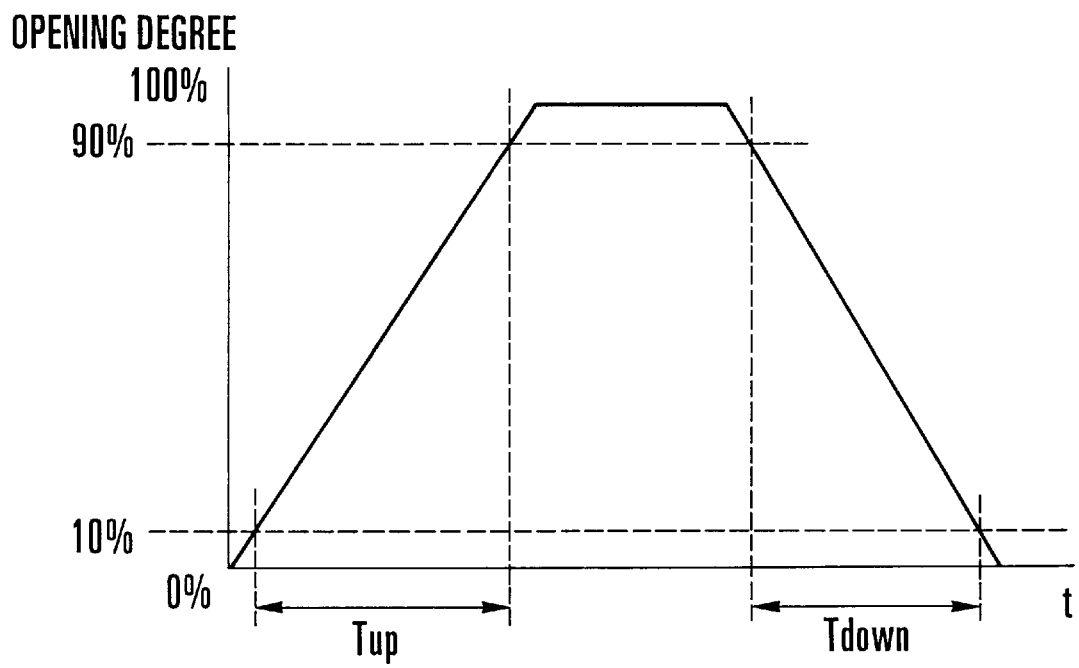
FIG. 7 is a graph for explaining the relationship between the valve opening degree of the regulating valve and the response time.
FIG. 8 is a view showing an operating unit size/response time table.

In the flow chart shown in FIG. 6, first of all, the coil driving current IM is set to IMMIN (0 mA) (step S601), and the coil driving current IM is set to IMMAX (maximum value) (step S602). With this operation, as shown in FIG. 7, the opening degree position of the valve 23 of the regulating valve 2 continuously changes from the 0% position to the 100% position. The response time in this case, e.g., a time Tup taken for a shift from the 10% position to the 90% position, is measured (step S603).

After the opening degree position of the valve 23 reaches the 100% position, the coil driving current IM is set to IMMIN (0 mA) (step S604). With this operation, as shown in FIG. 7, the opening degree position of the valve 23 continuously changes from the 100% position to the 0% position. The response time in this case, for example, a time Tdown taken for a shift from the 90% position to the 10% position, is measured (step S605).

A response time TRES (TRES=(Tup+Tdown)/2) between the 10% position and the 90% position is obtained as the average of Tup measured in step S603 and Tdown measured in step S605 (step S606). In this case, the average of Tup and Tdown is obtained in consideration of a case wherein Tup≠Tdown. That is, since some operating unit 21 varies in speed depending on the direction in which the opening degree increases or decreases, an accurate time can be obtained by averaging Tup and Tdown.

The size of the operating unit 21 is determined from the operating unit size/response time table shown in FIG. 8 on the basis of the response time TRES obtained in step S606 (step S607). In this embodiment, Tdown is measured after Tup is measured. However, the sequence of this processing may be reversed such that Tup is measured after Tdown is measured.

Figure 9A:
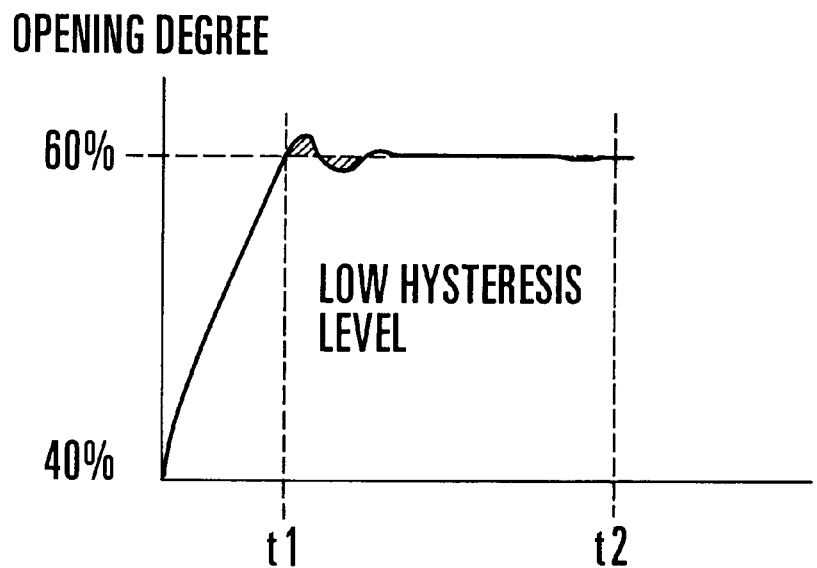
FIGS. 9A and 9B are graphs respectively showing step responses with low and high hysteresis levels.
Figure 9B:
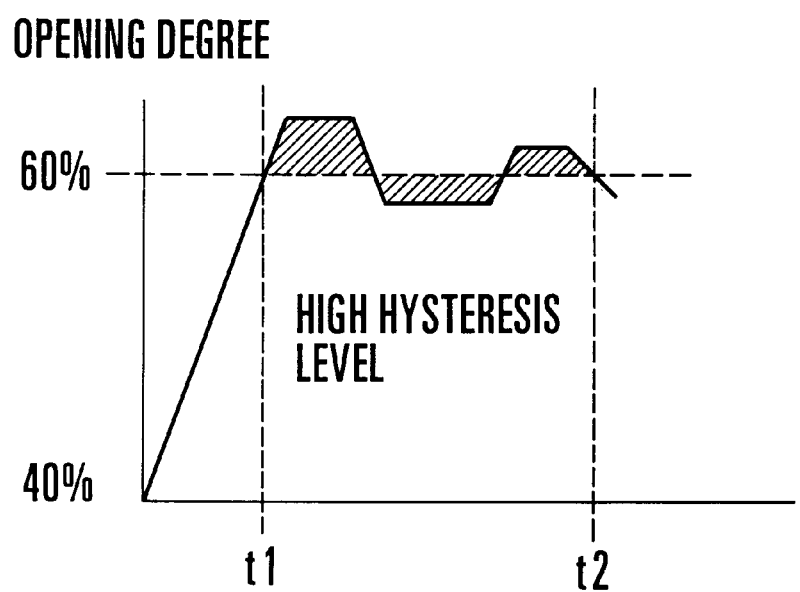

After a valve opening degree set value SP is set to, for example, SP40 (a set value for the 40% position) (step S608), the valve opening degree set value SP is set to, for example, SP60 (a set value for the 60% position) (step S609). With this operation, as shown in FIGS. 9A and 9B, the opening degree position of the valve 23 of the regulating valve 2 exhibits a step response from the 40% position to the 60% position. FIG. 9A shows a step response with a low hysteresis level. FIG. 9B shows a step response with a high hysteresis level.

Subsequently, an error area Es corresponding to this step response is obtained, and an error average EA is obtained from the obtained error area Es (step S610). In this case, by setting $$\text{error area } Es = \int_{t1}^{t2} |E|\, dt$$

the error average EA is obtained as EA=Es/(t2−t1)

A hysteresis level HYS is determined from the HYS/EA table shown in FIG. 10 on the basis of the obtained error average EA (step S611).

Parameter candidates are then selected from the PID control parameter table shown in FIG. 11 on the basis of the operating unit size determined in step S607 and the hysteresis level HYS determined in step S611, and the corresponding currently set PID control parameters are replaced with the selected parameter candidates (step S612). Referring to FIG. 11, KP, TI, TD, GE, GKP, GT1, and GTD are the PID parameters for the control formulae expressed by equations (6) and (7).

$$\text{If } |e| \leq GE,\ U=KP[e+(1/TI)\int e\,dt+TD(de/dt)] \qquad \ldots (6)$$

$$\text{If } |e| > GE,\ U=GKP[e+(1/GTI)\int e\,dt+GTD(de/dt)] \qquad \ldots (7)$$

According to automatic tuning in FIG. 6, even if the operating unit size and hysteresis level of the regulating valve 2 are unknown, the control parameters can be easily tuned to parameters suitable for the operating unit.

Second Embodiment

[Automatic Maintenance (Automatic Setting, Zero/Span Adjustment, Automatic Tuning)]

Automatic setting, zero/span adjustment, and automatic tuning have been described above as individual processes with reference to FIGS. 3, 5, and 6. Automatic setting in FIG. 3 is performed only when the electropneumatic positioner 3 is installed, but zero/span adjustment in FIG. 5 and automatic tuning in FIG. 6 are also performed in periodic maintenance. In consideration of this periodic maintenance, automatic setting, zero/span adjustment, and automatic tuning are designed to be performed in response to individual commands.

However, all the processes, i.e., automatic setting, zero/span adjustment, and automatic tuning, are required before the valve is actually controlled upon installation of the electropneumatic positioner 3. For this reason, the second embodiment is characterized in that automatic setting, zero/span adjustment, and automatic tuning are consecutively performed in accordance with the flow chart shown in FIG. 12 in response to an automatic maintenance command. This facilitates maintenance operation while eliminating artificial mistakes.

Figure 12:
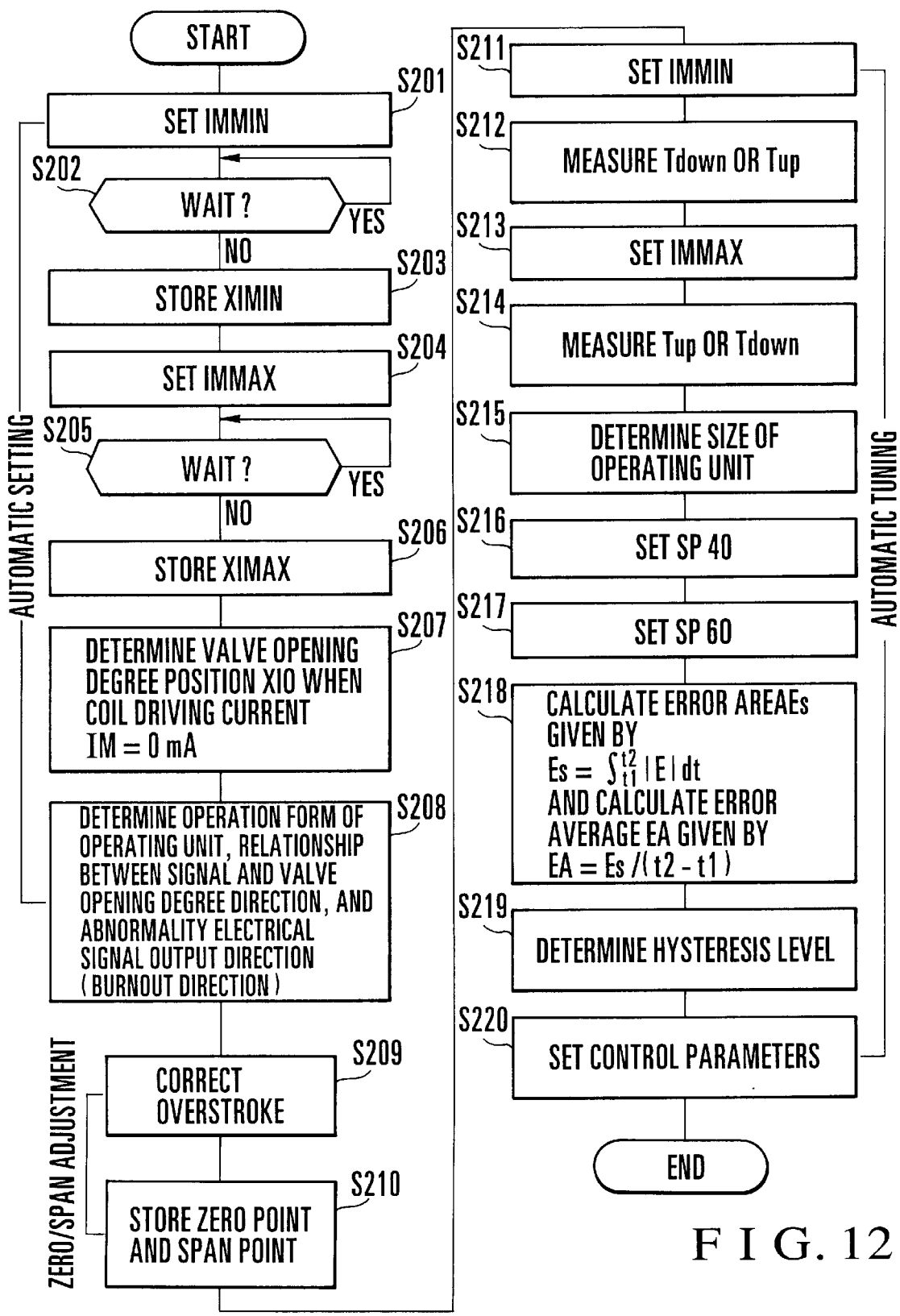
FIG. 12 is a flow chart showing automatic maintenance control executed by the data processing section of an electropneumatic positioner according to the second embodiment of the present invention.

Referring to FIG. 12, XIMIN and XIMAX are stored in steps S203 and S206 corresponding to steps S104 and S107 in FIG. 3. A valve opening degree position XI0 set when a coil driving current IM is 0 mA is determined in step S207 corresponding to step S108. In step S208 corresponding to step S109, "operation form of operating unit", "relationship between signal and valve opening degree direction", and "abnormality electrical signal output direction (burnout direction)" are determined.

In steps S209 and S210 following "automatic setting" in steps S201 and S208, "zero/span adjustment" is performed in the same manner as in FIG. 5. In steps S211 and S220 following "zero/span adjustment", "automatic tuning" is performed in the same manner as in FIG. 6.

FIGS. 13A and 13D show the functional blocks of a CPU 32a corresponding to the control operations in FIGS. 3, 5, 6, and 12.

Referring to FIG. 13A, a first position determining section 301 executes steps S101 and S107 in FIG. 1, a second position determining section 302 executes step S302, a signal setting section 303 sets an input current value and a valve opening degree direction in step S109, an abnormality signal setting section 304 sets an abnormality electrical signal output direction in step S109, and an operation form determining section 305 sets the operation form of the operating unit in step S109.

A signal setting section 303' determines the relationship between the maximum and minimum signals of electrical signals and the fully open/closed direction corresponding to the valve opening degree of a regulating valve 2 on the basis of an operation form PACT of an electropneumatic positioner 3 itself, an operation form AACT of an operating unit 21, and a valve plug form VACT of the regulating valve 2. An abnormality signal setting section 304' sets an input current value and an abnormality electrical signal output direction on the basis of the operation form PACT of the electropneumatic positioner 3 itself, the operation form AACT of the operating unit 21, the valve plug form of VACT of the regulating valve 2.

Referring to FIG. 13B, a valve opening degree control section 306 executes steps S501 and S506 in FIG. 5, and a position determining section 307 executes steps S508 and S509.

Referring to FIG. 13C, a size determining section 308 executes steps S601 to S607 in FIG. 6, a level determining section 309 executes steps S608 to S611, and a parameter setting section 311 executes step S612. A response time calculating section 310 of the size determining section 308 executes step S606.

Referring to FIG. 13D, a signal setting section 312 executes steps S201 to S208 in FIG. 12, first and second position determining sections 313 and 314 execute steps S209 and S210, a size/level determining section 315 executes steps S211 and S219, and a parameter setting section 316 executes step S220.

As has been described above, according to the present invention, setting of the maximum and minimum signals of input electrical signals as signals each for controlling the valve opening degree of the regulating valve in the full opening/closing direction (setting of the relationship between the electrical signals and the valve opening degree directions), setting of an electrical signal output direction upon occurrence of an abnormality, zero/span adjustment, tuning of control parameters, and the like are automatically performed, thereby reducing the load on the operator in installation and periodic maintenance. This can also eliminate artificial mistakes.

What is claimed is:

1. An electropneumatic positioner comprising:
    control means for outputting an electrical signal on the basis of an automatic setting command; and
    electropneumatic conversion means for converting the electrical signal from said control means into an air pressure, said electropneumatic positioner being adapted to control a valve opening degree of a regulating valve for opening/closing a channel by supplying the air pressure from said electropneumatic conversion means to an operating unit of said regulating valve,
    said control means including:
    first position determining means for obtaining valve opening degree positions of said regulating valve as minimum and maximum valve opening degree positions which are set when a driving signal for conversion from an electrical signal into an air pressure is set to a minimum signal and a maximum signal;
    second position determining means for obtaining the valve opening degree position of said regulating valve which is set when the driving signal is the minimum signal on the basis of a relative positional relationship between the obtained minimum and maximum valve opening degree positions and a valve plug form of said regulating valve; and
    first setting means for setting a relationship between the maximum and minimum signals of electrical signals and full opening and closing directions corresponding to valve opening degrees of said regulating valve.

2. A positioner according to claim 1, wherein said control means further comprises second setting means for setting an electrical signal corresponding to the valve opening degree of said regulating valve at the occurrence of an abnormality on the basis of the valve opening degree position of said regulating valve which is set when the driving signal is the minimum signal.

3. A positioner according to claim 1, wherein said positioner further comprises an angle sensor for detecting the valve opening degree position of said regulating valve as an angle; and
    said control means obtains the valve opening degree of said regulating valve by using an output from said angle sensor.

4. An electropneumatic positioner comprising:
    control means for outputting an electrical signal on the basis of an automatic setting command; and
    electropneumatic conversion means for converting the electrical signal from said control means into an air pressure, said electropneumatic positioner being adapted to control a valve opening degree of a regulating valve for opening/closing a channel by supplying the air pressure from said electropneumatic conversion means to an operating unit of said regulating valve,
    said control means including
    first setting means for setting a relationship between maximum and minimum signals of electrical signals and full opening and closing directions corresponding to valve opening degrees of said regulating valve on the basis of an operation form of said electropneumatic positioner, an operation form of said operating unit, and a valve plug form of said regulating valve.

5. A positioner according to claim 4, wherein said control means further comprises:
    position determining means for obtaining valve opening degree positions of said regulating valve as minimum and maximum valve opening degree positions which are set when a driving signal for conversion from an electrical signal into an air pressure is set to a minimum signal and a maximum signal; and
    operation form determining means for obtaining the operation form of said operating unit on the basis of a relative positional relationship between the obtained minimum and maximum valve opening degree positions, the operation form of said electropneumatic positioner, and the valve plug form of said regulating valve, and said setting means performs setting operation by using the operation form of said operating unit which is obtained by said operation form determining means.

6. A positioner according to claim 4, wherein said control means further comprises second setting means for setting an electrical signal corresponding to the valve opening degree of said regulating valve at the occurrence of an abnormality on the basis of the operation form of said electropneumatic positioner, the operation form of said operating unit, and the valve plug form of said regulating valve.

7. An electropneumatic positioner comprising:

control means for outputting an electrical signal on the basis of a zero/span adjustment command; and electropneumatic conversion means for converting the electrical signal from said control means into an air pressure, said electropneumatic positioner being adapted to control a valve opening degree of a regulating valve for opening/closing a channel by supplying the air pressure from said electropneumatic conversion means to an operating unit of said regulating valve, said control means further including:

valve opening degree control means for controlling the valve opening degree of said regulating valve to a maximum opening degree set to a value larger than a value corresponding to an actual full opening position after controlling the valve opening degree of said regulating valve to a value corresponding to a fully closed state; and position determining means for obtaining, as a temporary full opening position, a valve opening degree position set when said regulating valve is set to a maximum opening degree, and obtaining an actual full opening position of said regulating valve by performing overstroke correction for the obtained temporary full opening position.

8. A positioner according to claim 7, wherein said control means comprises storage means for storing, as a zero position, a valve opening degree position set when said regulating valve is set in a fully closed state, and storing the obtained actual full opening position as a span point position.

9. A positioner according to claim 7, wherein said valve opening degree control means determines a first driving signal for controlling the valve opening degree of said regulating valve to a value corresponding to a fully closed state on the basis of the operation form of said electropneumatic positioner, the operation form of said operating unit, and the valve plug form of said regulating valve, and determining a reverse signal of the set first driving signal as a second driving signal for controlling the valve opening degree of said regulating valve to a maximum opening degree.

10. An electropneumatic positioner comprising:

control means for outputting an electrical signal on the basis of an automatic control parameter tuning command; and electropneumatic conversion means for converting the electrical signal from said control means into an air pressure, said electropneumatic positioner being adapted to control a valve opening degree of a regulating valve for opening/closing a channel by supplying the air pressure from said electropneumatic conversion means to an operating unit of said regulating valve, said control means including:

size determining means for determining a size of said operating unit on the basis of a response time of said regulating valve which is taken when said regulating valve is actually driven;

level determining means for determining a hysteresis level of said operating unit on the basis of a step response of said regulating valve from a first valve opening degree position and a second valve opening degree position; and parameter setting means for selecting parameter candidates from a prepared control parameter table on the basis of the determined size and hysteresis level of said operating unit, and replacing corresponding currently set control parameter with the selected parameter candidates.

11. A positioner according to claim 10, wherein said size determining means further comprises calculation means for calculating the response time of said regulating valve by obtaining an average of a first time taken for a shift of said regulating valve from a third valve opening degree position to a fourth valve opening degree position and a second time taken for a shift from the fourth valve opening degree position to the third valve opening degree position.

12. An electropneumatic positioner comprising:

control means for outputting an electrical signal on the basis of an automatic maintenance command; and electropneumatic conversion means for converting the electrical signal from said control means into an air pressure, said electropneumatic positioner being adapted to control a valve opening degree of a regulating valve for opening/closing a channel by supplying the air pressure from said electropneumatic conversion means to an operating unit of said regulating valve, said control means including:

setting means for setting a relationship between maximum and minimum signals of the input electrical signals and full opening and closing directions corresponding to valve opening degrees of said regulating valve;

first position determining means for obtaining a zero point position as a reference to be used when the valve opening degree of said regulating valve is to be controlled;

second position determining means for obtaining a span position as an actual full opening position of said regulating valve;

size/level determining means for determining a size of and hysteresis level of said operating unit; and parameter setting means for selecting parameter candidates from a prepared control parameter table on the basis of the size and hysteresis size of said operating unit, and replacing corresponding currently set control parameters with the selected parameter candidates.

* * * * *

UNITED STATES PATENT AND TRADEMARK OFFICE
CERTIFICATE OF CORRECTION

PATENT NO. : 5,931,180
DATED : August 3, 1999
INVENTOR(S) : Nagasaka It is certified that error appears in the above-identified patent and that said Letters Patent is hereby corrected as shown below:

In column 3, line 66, delete "opening position" and insert -- opening positions -- .

In column 9, line 2, delete "steps S201 and S208" and insert -- steps S201 to S208 -- .

In column 9, line 10, delete "steps S101 and S107" and insert -- steps S101 to S107 -- .

In column 9, line 45, delete "steps S211 and S219" and insert -- steps S211 to S219 -- .

Signed and Sealed this

Twentieth Day of March, 2001

Attest:

NICHOLAS P. GODICI

*Attesting Officer*     *Acting Director of the United States Patent and Trademark Office*